United States Patent Office 3,264,177
Patented August 2, 1966

3,264,177
METHODS FOR THE CONTROL OF ARACHNIDS
Eugene E. Kenaga, Midland, Mich., assignor to The Dow Chemical Company, Midland, Mich., a corporation of Delaware
No Drawing. Filed Feb. 17, 1964, Ser. No. 345,131
6 Claims. (Cl. 167—30)

This invention is concerned with pesticides and is particularly directed to methods for the control of injurious and objectionable arthropods of the class Arachnida.

It is an object of the present invention to provide a new and improved method for the kill and control of many common household, industrial, and agricultural pests. A further object is the provision of a method wherein many arachnid organisms that are dangerous to man and animals or injurious to plants may be controlled without injurious side effects. Yet another object is the provision of compositions to be employed in the novel methods for arachnid control. Additional objects will become apparent from the following specification and claims.

In accordance with the present invention, it has been discovered that a tin compound of the formula

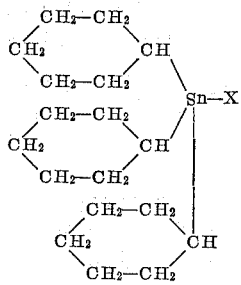

is an excellent arachnicide and is adapted to be employed for the control of pests of this zoological class. In this and succeeding formulae, X represents hydroxyl, bromo, chloro, fluoro, iodo, formyloxy, alkenyl, Alkanoyloxy
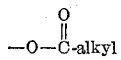
(Tricyclohexylstannyloxy)alkoxy
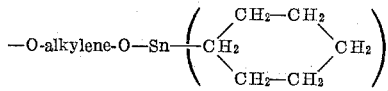
Tricyclohexylstannyl
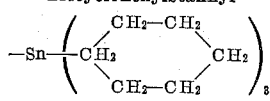
Tricyclohexylstannyloxy
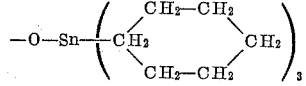
Tricyclohexylstannylthio
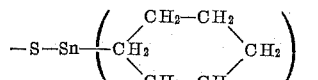
Bis(tricyclohexylstannyloxy)-boryloxy
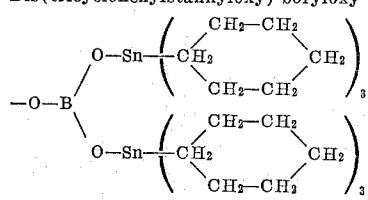

Tricyclohexyltinsulfinyl
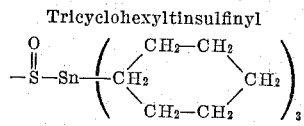
Tricyclohexyltinsulfonyl
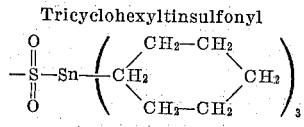
Alkylsulfonylthio
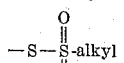
Phenylsulfonylthio
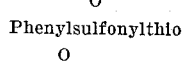
Halophenylsulfonylthio
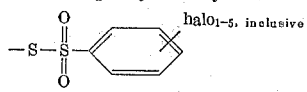
Alkanoylthio
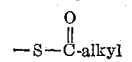
Benzoylthio
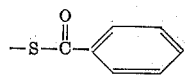

or

Halobenzoylthio
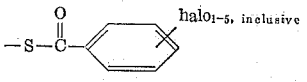

These tin compounds are crystalline solid materials which are somewhat soluble in many common organic solvents and most of them are of low solubility in water. They are adapted readily and conveniently to be employed as toxicants in the control of objectionable arachnids of many kinds and particularly those ordinarily found upon and attacking warm-blooded animals and economic plants. Representative organisms that are controlled according to the present invention include the genus Limulus, scorpions, the order of Phalangidae, tarantulas, spiders, and in particular those of the genera Latrodectus and Theridion. Also, the invention controls mites such as those of the genus Sarcoptes; also the chicken mites and the Ixodidae of which many are disease vectors; and chiggers, and plant pests called "red-spiders."

All experience indicates that the unique arachnicidal properties of the compounds herein derive from the tricyclohexyltin group, irespective of what other moiety or moieties may be present thereon. Because it is desired to kill the arachnids, this moiety need not be systemically acceptable. However, it should be of such size that the tricyclohexyltin moiety represents, on a molar fraction basis, a significant or major part of the molecule, and the entire resulting substance should possess acceptable collateral properties, such as chemical stability or instability, solubility or insolubility, color or lack of it, cost, and the like. On such grounds auxiliary to the present invention, the most useful alkenyltricyclohexyltins are those of which the alkenyl group is from two to about twenty, both inclusive, carbon atoms, such as vinyl, allyl, 2-butenyl, 2-pentenyl, 5-hexenyl, 3-heptenyl, 1-octenyl, 3,3-diethylpent-1-enyl, 9-decenyl, 2-pentadecenyl which will usually be a mixture of isomers, oleoyl, which can be derived inexpensively from animal fats, and 2-eicosenyl.

Similarly, and on the same general grounds, the most useful alkanoyloxytricyclohexyltin compounds are those in which the alkanoyloxy groups can be regarded as a residue of an aliphatic acid of from two to about twenty, both inclusive, carbon atoms, such as the alkanoyloxy residues of acetic, isovaleric, caproic, caprylic, capric, lauric, myristic, palmitic, stearic, and arachidic acids.

Among the (tricyclohexylstannyloxy)alkoxytricyclohexyl tin compounds, the most highly regarded are those in which the alkylene moiety is of from 1 to about 4 carbon atoms, although when oil solubility is desired, especially when water emulsification of the resulting oil solution is desired, alkylenes of from 4 up to about 10 or even 20, both inclusive, carbon atoms are more satisfactory. Thus, representative such compounds include (Tricyclohexylstannyloxy)methoxy tricyclohexyl tin;
(Tricyclohexylstannyloxy)trimethyleneoxy tricyclohexyl tin;
(Tricyclohexylstannyloxy)propoxytricyclohexyl tin; and
(Tricyclohexylstannyloxy)tetramethyleneoxy tricyclohexyl tin.

When greater compatibility with oil is desired, one will prefer, for example, (Tricyclohexylstannyloxy)pentoxytricyclohexyl tin; or
(Tricyclohexylstannyloxy)tridecyloxy tricyclohexyl tin.

Also, (Tricyclohexylstannyloxy)hexadecycloxy tricyclohexyltin and
(Tricyclohexylstannyloxy)nonadecyloxy tricyclohexyl tin.

The alkanoylthiotricyclohexyltin compounds have various side effects different from those of the alkanoyloxytricyclohexyltin compounds, but as to their arachnicidal effects, are essentially the same. Thus among such compounds when high specific molar activity is desired, it is achieved by employment of, for example, acetylthiotricyclohexyltin, and propionylthio tricyclohexyltin. However, alkanoylthio groups of from 2 up to about 20 carbon atoms are successfully employed. Thus among the serviceable compounds there are Butyroylthiotricyclohexyltin,
Valeroylthiotricyclohexyltin,
Hexanoylthiotricyclohexyltin,
Heptanoylthiotricyclohexyltin,
Octanoylthiotricyclohexyltin,
Nonanoylthiotricyclohexyltin,
Decanoylthiotricyclohexyltin,
Undecanoylthiotricyclohexyltin,
Lauroylthiotricyclohexyltin,
Tridecanoylthiotricyclohexyltin,
Myristoylthiotricyclohexyltin,
Pentadecanoylthiotricyclohexyltin,
Palmitoylthiotricyclohexyltin,
Heptadecanoylthiotricyclohexyltin,
Stearoylthiotricyclohexyltin,
Nonadecanoylthiotricyclohexyltin,
Eicosanoylthiotricyclohexyltin, and the position isomers of the foregoing with respect to the aliphatic carbon chains, such as 2,2,4,4-tetramethylbutyroylthiotricyclohexyltin, and the like.

Also, when a preferred arachnicide or group of arachnicides is, or includes, an alkylsulfonylthiotricyclohexyltin, the compounds characterized by lower alkyl groups may be preferred, or those of higher molecular weight may have advantages. These advantages diminish in the compounds having alkyl groups of more than about 20 carbon atoms.

Thus, the alkylsulfonylthiotricyclohexyltin compounds most commonly chosen will include Methylsulfonylthiotricyclohexyltin,
Ethylsulfonylthiotricyclohexyltin,
Propylsulfonylthiotricyclohexyltin,
Butylsulfonylthiotricyclohexyltin,
2,2-dimethylpropylsulfonylthiotricyclohexyltin,
Hexylsulfonylthiotricyclohexyltin,
4,4-dimethylpentylsulfonylthiotricyclohexyltin,
Dodecylsulfonylthiotricyclohexyltin,
Nonadecylsulfonylthiotricyclohexyltin and its next higher homologue, and the branched and straight chain position isomers.

Among the halophenylsulfonylthiotricyclohexyltin compounds, all are effective arachnicides although there are differences in molar activities and in side effects among the position isomers: useful such compounds include p-Chlorophenylsulfonylthiotricyclohexyltin,
p-Bromophenylsulfonylthiotricyclohexyltin,
p-Iodophenylsulfonylthiotricyclohexyltin,
p-Fluorophenylsulfonylthiotricyclohexyltin, and, in each case, the ar-orthohalo position isomer. Also, useful is metabromophenylsulfonylthiotricyclohexyltin, and its fluoro-, chloro-, and iodo-halogen analogues. Not only the monohalo compounds but the dihalo compounds including 2,4-difluorophenylsulfonylthiotricyclohexyltin,
2,4-dichlorophenylsulfonylthiotricyclohexyltin, and their bromine and iodine position isomers. Also, the compounds of mixed halogens such as
2-chloro-4-bromo-phenylsulfonylthiotricyclohexyltin,
2-fluoro-6-chloro-phenylsulfonylthiotricyclohexyltin, and
2-chloro-5-iodophenylsulfonylthiotricyclohexyltin.

The trihalophenyl starting compounds are sometimes the least expensive and there can be used as the present arachnicides each or any of 2,4,5-trifluorophenylsulfonylthiotricyclohexyltin,
2,4,6-trichlorophenylsulfonylthiotricyclohexyltin, and such mixed halogen analogues as 2-chloro-4,5-dibromophenylsulfonylthiotricyclohexyltin,
2,4-dibromo-5-iodophenylsulfonylthiotricyclohexyltin, and
2,3,4-trifluorophenylsulfonylthiotricyclohexyltin.

The tetrahalo and pentahalophenylsulfonylthiotricyclohexyltin compounds whereof halogen is of the identity and variety hereinbefore named tend to be less soluble and more costly but, in contrast, of usefully greater chemical stability: they are comprehened herein, also.

Much the same range of substituents is comprehended under the halobenzoylthiotricyclohexyl tin compounds, such as Pentachlorobenzoylthiotricyclohexyl tin,
Pentafluorobenzoylthiotricyclohexyltin,
3,4,5-trichloro-2,6-difluorobenzoylthiotricyclohexyltin,
2,3,5,6-tetrachlorobenzoylthiotricyclohexyltin, and such lower analogues as p-Iodobenzoylthiotricyclohexyltin,
2,4,5-trichlorobenzoylthiotricyclohexyltin,
2,6-difluoro-4-iodobenzylthiotricyclohexyltin, and the analogues and position isomers of the indicated genus that are thereby comprehended.

As a preferred compound may be chosen for its preferred side effects and properties, all the indicated compounds being arachnicidal, when certain combinations of side effects are wanted, one, two, or several of the compounds will be combined. Thus, the present invention in arachnicides comprehends all the subgeneric combinations and mixtures of the present compounds, all of which combinations and each of the components of which are arachnicidal but of various of which the auxiliary properties vary.

When it is desired to bring about control of pests other than arachnids at the same time and in the same locus as it is desired to bring about control of arachnids, a toxicant of the present invention or a composition of which such toxicant is an active ingredient can be mixed with other toxicants or with compositions of which other toxicants are the active ingredients. Such substances include plant growth modifying agents.

Of the plant growth modifying agents to be combined with one or more of the present arachnicidal compounds, particular importance attaches to those that are employed as defoliants such as cotton defoliants and to those that are employed as herbicides. For reasons that are incompletely understood, plant parasitic arachnid populations often increase dramatically upon mature cotton plants that have been chemically treated to defoliate them prior to mechanical harvesting. The resulting arachnid populations may be of only limited adverse effect upon the economic yield of existing, mature cotton plants, but, depending upon various factors such as weather and cultural practices observed, may provide a heavy inoculum for the following year with resulting serious damage, or need for major control measures, to the succeeding crop.

Similarly, when herbicidal substances, particularly selective herbicidal substances, are used to kill and control undesired vegetation in an area of mixed vegetative types, as when a herbicide is used to kill weeds in a crop area, it sometimes happens that arachnid parasites upon the weed population migrate from the moribund weeds to undamaged plant species, with the result that arachnid populations upon the undamaged plants increase greatly.

Such undesired increase of arachnid parasites can be controlled to a large extent by inclusion of one or more of the arachnicide agents of the present invention in a herbicidal formulation.

Active toxicants of such herbicides are the known agents such as 2-chloro-4,6-bis(ethylamino)-s-triazine;
2-chloro-4-ethylamino-6-isopropylamino-s-triazine;
2-methoxy-4,6-bis(isopropylamino)-s-triazine;
3-(p-chlorophenyl)-1,1-dimethylurea;
3-(p-chlorophenyl)-1,1-dimethylurea acetate;
3-phenyl-1,1-dimethylurea;
3-phenyl-1,1-dimethylurea trichloroacetate;
2,4-dichlorophenoxyacetic acid, its salts and esters;
2,4,5-trichlorophenoxyacetic acid, its salts and esters;
2-methyl-4-chlorophenoxyacetic acid, its salts and esters;
2-(2,4,5-trichlorophenoxy)propionic acid, its salts and esters;
Propylethyl-n-butylthiol carbamate;
Isopropyl N-(3-chlorophenyl)carbamate;
Cis and trans 2,3-dichloroallyl-diisopropyl thiocarbamate;
Ethyl di-n-propylthiocarbamate;
4-chloro-2-butynyl N-(3-chlorophenyl)carbamate;
2,3,6-trichlorobenzoic acid, its salts and esters;
2,3,5,6-tetrachlorobenzoic acid, its salts and esters;
2-methoxy-3,6-dichlorobenzoic acid, its salts and esters;
2,2-dichloropropionic acid, its salts and esters;
Trichloroacetic acid, its salts and esters;
4,6-dinitro-o-sec.-butylphenol;
3,5-dinitro-o-cresol;
Pentachlorophenol;
5-bromo-3-isopropyl-6-methyluracil;
Sodium arsenite;
Dimethylarsenic acid, tricalcium arsenate;
Sodium chlorate;
Sodium borates;
3,6-endoxohexahydrophthalic acid;
O-(2,4-dichlorophenyl)-O-methyl isopropylphosphoramidothioate;
3,4-dichloropropionanilide;
1,2-dihydroxypyridazine-3,6-dione;
3-amino-1,2,4-triazole;
2,3,6-trichlorophenylacetic acid, its salts and esters;
1,1'-ethylene-2,2'-dipyridylium dibromide;
2,6-dinitro-N,N-di-n-propyl-2,2,2-trifluoro-p-toluidine;
α-Chloro-N-diallylacetamide;
Herbicidal oils;

and other inorganic salts and aliphatic, aromatic and heterocyclic organic compounds. Also, when desired, an insecticide can be included with the toxicant of the present invention. Such insecticide includes phosphorus compounds, for example, O-(4-t-butyl-2-chlorophenyl) O-methyl methylphosphoramidothioate,
O,O-diethyl O-(3-chloro-4-methyl-2-oxo-2H-1-benzopyran-7-yl) phosphorothioate,
O,O-dimethyl O-(2-chloro-4-nitrophenyl) phosphorothioate,
O,O-dimethyl S(N-methylcarbamoyl)methyl phosphorodithioate,
O-ethyl O-p-nitrophenyl phenylphosphorothioate,
O,O-diethyl S-[4-oxo-1,2,3-benzotriazin-3(4H)-yl-methyl] phosphorodithioate,
O,O-dimethyl S-[4-oxo-1,2,3-benzotriazin-3(4H)-ylmethyl] phosphorodithioate,
O,O-dimethyl S-phthalimidomethyl phosphorodithioate,
O,O-dimethyl O-p-nitrophenyl phosphorothioate,
O,O-dimethyl O-(2,4,5-trichlorophenyl) phosphorothioate, and
O-ethyl-O-p-nitrophenyl benzenephosphorothioate. Also,
O-(2,4-dichlorophenyl) O-methyl N-isopropylphosphoramidothioate,
O,O-diethyl O-(4-methylumbelliferone) phosphorothioate,
O,O-dimethyl O-(4-methylumbelliferone) phosphorothioate,
O-(3-chloro-4-methylumbelliferone) O,O-diethyl phosphorothioate,
O-(3-chloro-4-methylumbelliferone) O,O-dimethyl phosphorothioate,
2,3-p-dioxanedithiol S,S-bis(O,O-dimethylphosphorodithioate),
O,O-diethyl O-(2-isopropyl-6-methyl-4-pyrimidinyl) phosphorothioate,
O,O-diethyl O-3-(6-methyl-2-propyl-4-pyrimidinyl) phosphorothioate,
O,O-diethyl O-3-methyl-5-pyrazolyl phosphorothioate,
O,O-diethyl O-2-pyrazinyl phosphorothioate,
O-(1,6-dihydro-6-oxopyridazin-3-yl) O,O-diethyl phosphorothioate,
O-(1,6-dihydro-6-oxopyridazin-3-yl) O,O-dimethyl phosphorothioate,
O-(1,6-dihydro-6-oxo-1-phenylpyridazin-3-yl) O,O-diethyl phosphorothioate,
O,O-dimethyl S-4-oxo-1,2,3-benzotriazin-3(4H)-ylmethyl phosphorodithioate,
O,O-diethyl S-4-oxo-1,2,3-benzotriazin-3(4H)-ylmethyl phosphorodithioate,
O,O-diethyl O-naphthalimido phosphorothioate,
O,O-dimethyl O-p-nitrophenyl phosphorothioate,
O,O-diisopropyl O-p-nitrophenyl phosphorothioate,
O-(2-chloro-4-nitrophenyl) O,O-dimethyl phosphorothioate,
O-(3-chloro-4-nitrophenyl) O,O-dimethyl phosphorothioate,
O-2,4-dichlorophenyl O-methyl methylphosphorothioate,
O-2,4-dichlorophenyl O,O-diethyl phosphorothioate,
O,O-dimethyl O-[4-(methylthio)-m-tolyl] phosphorothioate,
O,O-diethyl O-[4-(methylthio)-m-tolyl] phosphorothioate,
O,O-dimethyl O-p-(methylsulfinyl)phenyl phosphorothioate,
O,O-diethyl O-p-(methylsulfinyl)phenyl phosphorothioate,
O,O-di-n-propyl O-p-(methylsulfinyl)phenyl phosphorothioate,
O,O-dimethyl S-[(p-chlorophenylthio)methyl] phosphorodithioate,
S-[(p-chlorophenylthio)methyl] O,O-diethyl phosphorodithioate, O,O-dimethyl S-2,5-dichlorophenylmercaptomethyl phosphorodithioate,
O,O,O,O-tetraethyl dithiopyrophosphate,
O,O,O',O'-tetraethyl S,S'-methylene bisphosphorodithioate,
O,O-diethyl S-ethylthiomethyl phosphorodithioate,
O,O-diethyl S-n-propylthiomethyl phosphorodithioate,
O,O-diethyl S-isopropylthiomethyl phosphorodithioate,
O,O-diisopropyl S-isopropylthiomethyl phosphorodithioate,
S-ethyl thioethyl O,O-dimethyl phosphorodithioate,
S-2-isopropylethylsulfinyl O,O-dimethyl phosphorothioate,
S-(2-ethylsulfinylethyl) O,O-dimethyl phosphorodithioate, mixture of
O,O-diethyl S-(and O) (2-ethylthio)ethyl phosphorothioate,
O,O-diethyl S-2-(ethylthio)ethyl phosphorodithioate,
O,O-dimethyl S-(1,2-dicarbethoxyethyl) dithiophosphate,
S-carbamoylmethyl O,O-dimethyl phosphorodithioate,
S-methylcarbamoylmethyl O,O-dimethyl phosphorodithioate,
S-ethylcarbamoylmethyl O,O-dimethyl phosphorodithioate,
S-(isopropylcarbamoylmethyl) O,O-dimethyl phosphorodithioate,
O,O-diethyl S-isopropylcarbamoylmethyl phosphorodithioate,
O,O-dimethyl S-(2-oxo-2-ureidoethyl) phosphorodithioate, and
S-diethylthiocarbamoyl O,O-diisopropyl phosphorothioate.

Also, insecticidal, attractant, and other substances that can be combined with the toxicants of the present invention are those set forth in the Bulletin of the Entomological Society of America, volume 9, number 2, pages 67 to 103 (June 1963) by Kenaga.

Such mixtures may be extraordinarily beneficial in practical applications, since use of insecticides frequently destroys predators which, if permitted to survive, tend to maintain biological control of arachnids. Thus, the often undesirable results from use alone of an insecticide can be controlled by the employment of one or more of the present arachnicides together with such insecticide.

It is an advantage of the present invention that compositions containing these compounds can be applied to host epithelium in amounts required for effective control without injury or inconvenience to the host. It is a further advantage that a single application of the compounds can provide a residual and extended control of the arachnids over a period of which the duration depends to some extent upon weather and mechanical and biological influences, but is sometimes as long as several months.

When it is desired to prepare a stable aqueous formulation with which to practice the present invention, a particular embodiment preferred because of its water solubility is tricyclohexyltin acetate.

When it is desired to practice the present invention with the use of compounds that are least expensive in the market, a preferred compound will be a member of the group consisting of tricyclohexyltin hydroxide, tricyclohexyl tin chloride, and tricyclohexyl tin bromide.

When it is preferred to practice the present invention with a compound of which the molar efficiency is as great as possible or nearly so, a preferred compound will be selected from the group consisting of a polykis(tricyclohexyltin) salt of an alkanepolycarboxylic acid, such as a bis(tricyclohexyltin)alkanedicarboxylate, for example, a bis(tricyclohexyltin)oxalate or a bis(tricyclohexyltin)-malonate; also bis(tricyclohexyltin)oxide and bis(tricyclohexyltin)sulfide, and tris(tricyclohexyltin)borate and bis-(tricyclohexyltin)sulfate.

When it is preferred to practice the present invention with the use of an oil solution that is water immiscible, or with an emulsion of toxicant, to which oil solubility of the toxicant is important, it will be preferred to employ a tricyclohexyltin higher alkyl such as a lauryltricyclohexyl tin, an oleyltricyclohexyl tin, and an eicosyltricyclohexyl tin.

Thus, as to efficiently killing arachnids, compounds to be employed according to the present invention are broadly equivalent: whereas, as to side effects and ease and convenience of use, the individual compounds and various groups of them manifest distinctive differences and bases for preference.

In carrying out the method of the present invention, the undesired pests are killed by contacting them with an arachnicidal amount of the tin compound. The present method sometimes embraces the employment of unmodified compound. However, oftentimes effective applications can be made only when employing specially formulated liquid or dust compositions containing the toxicant. Such compositions are adapted to be applied to living plants without substantial injury to the foliage thereof. However applied, the compound must ultimately be employed by contacting the arachnid with the said compound.

In preparing compositions for use, the tin compound is often augmented or modified by combining it with one or more of a plurality of pesticide additaments or adjuvants, including organic solvents, water or other liquid carriers, surface active dispersing agents or particulate and finely comminuted or divided solids. Depending upon the concentration of the tin compound in the composition, such augmented composition is adapted to be employed for the control of undesirable arachnids or employed as a concentrate and subsequently diluted with additional inert carrier to produce the ultimate treating compositions. In compositions to be employed as concentrates, the tin toxicant can be present in concentration of from about 5 to about 98 percent by weight. Baits, attractants and the like can be included also. Other biologically active agents that are chemically compatible with the present tin compounds can also be added.

The exact concentration of the tin products to be employed in a composition for application to the pest, directly or by employment of its habitat or food as carrier, may vary provided that an arachnicidal dose of toxicant is contacted with the organism. The actual weight of this dose of toxicant may vary, and is primarily dependent upon the susceptibility of a particular organism to the tin compound. In general, good results are obtained with liquid compositions containing at least 0.0003 percent by weight of toxicant. Sometimes compositions containing as high as 90 percent by weight of toxicant can be employed in the treatment of arachnid environments or food such as in the preparation of food baits. With dusts, good results are obtained with compositions containing from 0.01 to 50 percent or more by weight of toxicant. Where the compositions are to be applied to living plants, it is preferred that the toxicant be present in an amount not to exceed about 1.0 percent in liquid compositions and about 10 percent in dusts.

In the preparation of dust compositions, the tin compound can be composited with any of the commonly employed finely divided solids such as fuller's earth, attapulgite, bentonite, pyrophyllite, vermiculite, diatomaceous earth, talc, chalk, gypsum, wood flour, and the like. In such operations, the finely divided carrier is ground or mixed with the toxicant or wetted with a dispersion of the toxicant in a volatile liquid. Depending upon the proportion of ingredients, these compositions can be employed as concentrates and subsequently diluted with additional solid of the sort indicated, to obtain the desired amount of active ingredient in a comminuted composition adapted to be employed for the control of pests. Also, such concentrate dust compositions can be dispersed in water with or without the aid of surface active agents to form spray mixtures. Further, the tin compounds or a liquid or dust concentrate composition containing such compounds can be incorporated in intimate admixture with surface active dispersing agents such as ionic or non-ionic emulsifying or dispersing agents to form spray concentrates. Such concentrates are readily dispersible in liquid carriers to form spray compositions or liquid formulations containing the toxicants in any desired amount. The choice of surface active agent and amount thereof employed are determined by the ability of the agent to facilitate the dispersion of the concentrate in the liquid carrier to produce the desired liquid composition. Suitable liquid carriers include water, methanol, ethanol, isopropanol, methylethyl ketone, acetone, methylene chloride, chlorobenzene, toluene, xylene, and petroleum distillates. Among the petroleum distillates are preferred those boiling almost entirely under 400° F. at atmospheric pressure and having a flash point above about 80° F.

Similarly, the toxicant may be compounded with a suitable water-immiscible organic liquid and a surface active dispersing agent to produce emulsifiable concentrates which may be further diluted with water and oil to form spray mixtures in the form of oil-in-water emulsions. In such compositions, the carrier comprises an aqueous emulsion, i.e. a mixture of water-immiscible solvent, emulsifying agent and water. Preferred dispersing agents which may be employed in these compositions are oil soluble and include the condensation products of alkylene oxides with phenols and organic and inorganic acids, polyoxyethylene derivatives of sorbitan esters, alkylarylsulfonates, complex ether alcohols, mahogany soaps and the like. Suitable organic liquids to be employed in the compositions include petroleum distillates, hexanol, liquid halohydrocarbons and synthetic organic oils. The surface active dispersing agents are usually employed in the liquid dispersions and aqueous emulsions in the amount of from about 1 to about 20 percent by weight of the combined weight of the dispersing agent and the active toxicant.

When operating in accordance with the present invention, the tin compound or a composition containing the compound can be applied to the arachnid pests to be controlled, or to their habitat or to their food in any convenient fashion, i.e., by means of hand dusters or sprayers or by simple mixing with the food to be ingested by the organisms. Applications to the foliage of plants conveniently is carried out with power dusters, boom sprayers and spray dusters. In such applications, when it is desirable to benefit the plants, the employed compositions should not contain substantial amounts of phytotoxic diluents. In large scale operations, dusts or low volume sprays may be applied from an aircraft.

The following examples represent the best embodiments of the present invention now known, and tell how to practice them.

*Example 1.—Preparation of formulated products*

Twenty-five parts by weight of tricyclohexyl tin hydroxide and bis(tricyclohexyl tin) oxide are each separately mixed and ground with 71 parts of fuller's earth, 2 parts of an alkyl aryl sulfonate (Nacconol NR) and 2 parts of a substituted benzoid alkyl sulfonic acid (Daxad No. 27) to prepare concentrate compositions in the form of a wettable powder and containing one of the tin compounds as an active agent.

Also, 95 parts by weight of tricyclohexyl tin chloride and 5 parts of a sorbitan monolaurate polyoxyethylene derivative (Tween 20) are mechanically mixed together to prepare a dispersible liquid concentrate composition.

In a further operation, 4 parts by weight of bis(tricyclohexyltin) sulfide, 90 parts of hexanol and 6 parts of dimeric alkylated aryl polyether alcohol (Triton X–155) are mechanically mixed together to prepare a concentrate composition in the form of an emulsifiable liquid.

These concentrates are dispersed in water to prepare aqueous compositions having very desirable wetting and adhering properties. The latter aqueous compositions are adapted to be employed to distribute the active toxicants in parasiticidal amounts.

Compositions comprising other toxicants of the present invention are prepared in analogous ways.

*Example 2.—Control of scorpions*

Six cages are provided, each with one end glass-enclosed and exposed to direct sunlight, the other end embedded in a bank of cool, moist topsoil, the floor of the cage essentially horizontal; each cage approximately two feet long, four inches high and four inches wide, and provided with a removable glass panel, as entry port, into the exposed, glassed end.

Transversely entirely across the floor of each of three of the cages at about a midline between the glassed end and the shaded end there is placed a band approximately two inches wide as measured along the long axis of the cage and about ⅛ inch deep, of an arachnicidal toxicant consisting essentially of 99.5 percent finely powdered clay and 0.5 percent tricyclohexyl tin hydroxide. In each of the other cages is placed a similar band of clay alone, as a check. As arranged, an occupant arachnid walking on the cage floor from the sunlit end to the buried end must walk through the band of powdered material, the upper surface of each of which is carefully smoothed to permit track studies.

Into the glassed end of each cage is introduced a mature, vigorous, healthy scorpion of average length about 2 inches, of undetermined species and sex. At once after orienting itself, each scorpion quickly travels to and remains at the dark end of the cage.

Twenty-four hours later the interiors of the cages are carefully studied, and the conditions of the surfaces of the powdered bands and occupants noted.

All scorpions in the three cages of which the powder band was described as containing tricyclohexyl tin hydroxide are dead: none shows broken members, ruptured articulations, or other evidence of gross body damage. Of the three powder bands two are described as showing one set of tracks made by the initial travel of the length of the cage, one is described as showing such tracks and an additional set of tracks intruding for a short distance into the powder band and withdrawing. Upon examination, all scorpions are found to have perceptible traces of the powdered material adherent to the last several segments of those forelegs that are supplied with digestive enzyme glands, and to the combs with which their ventral surfaces are provided, and in one of the animals, to the chelicerae.

The animals from the cages described as identical but that the powdered band was of clay only are alive and in good health; the upper surface of each powdered band is described as heavily tracked. This is taken to indicate repeated excursions of the length of the cage, probably at night. Distribution of the clay powder on the bodies of the live scorpions is described as not distinctively different from powder distribution on the bodies of the dead ones, but more general. Also it is noted that in the last 3 cages discussed, the formerly sharp boundaries of the powder band are described as being disordered as the result of repeated excursions through it.

*Example 3.—Control of Limulus*

Tricyclohexyl tin acetate is dispersed in sea water to prepare an aquarium composition mixture containing 0.005 pound of the acetate compound as sole toxicant per 100 gallons of ultimate mixture.

This composition is employed to fill an aquarium tank and therein is maintained at 65° F. Into the water in the tank are placed 8 young "horseshoe crabs," (taken in commercial oyster dredging operations) of average length, exclusive of tail, of about 4 inches. A similar check group is maintained in a similar aquarium of unmodified sea water. The aquaria are aerated and held under conditions generally favorable to the animals and observed daily and notes made of the conditions observed. After two days all the "crabs" in the water containing tricyclohexyl tin acetate are dead and all in the untreated water are alive.

*Example 4.—Control of house spiders*

A composition containing 0.04 pound of tricyclohexyl tin butyrate and 0.25 pound each of Nacconol NR and Daxad No. 27 per ten gallons total composition is prepared and employed as a thorough wetting spray of the interior of an unoccupied house heavily infested with the common house-spider and other spiders. All visible webs are swept down and their locations thoroughly wetted, as are all areas deemed likely to become foci of reinfestation. The site is examined two days later. No new webs have been spun, and no live spiders are found. The site is reinspected at weekly intervals for 2 months. No spider reinfestation is found at the end of this time, but the housefly population has risen conspicuously.

*Example 5.—Control of "Spider Mites"*

25 parts by weight of tricyclohexyl tin chloride, 71 parts of pyrophyllite, 2 parts of Daxad No. 27 and 2 parts of an alkyl naphthalene sulfonate (Petro WP) are mixed together to produce a concentrate composition in the form of a wettable powder. In an exactly analogous fashion a similar concentrate composition is prepared employing tricyclohexyl tin hydroxide as the toxicant. These concentrates are subsequently separately dispersed in separate quantities of water to prepare aqueous compositions each containing 1500 parts per million by weight of one of the tin compounds, and the compositions employed separately as sprays for control of red mites overwintering on separate groups of dormant immature apple trees.

In such operations, the compositions are contacted with the mites by the application to them, and incidentally to their dormant season habitat, of a thorough wetting spray. The contacting is also effectively carried out by so spraying as to lay down a barrier of tricyclohexyl tin compound where any mite moving from its dormant site in axillary crevices to foliage emerging in spring must cross the said barrier and make at least tarsal contact with the present materials. A check group of similar trees is similarly sprayed with aqueous preparations that are identical but for the absence from them of the tin compounds.

Emergence of foliage occurs and the trees are observed for a period of six weeks following the treating operations. Throughout the period of the observations, the untreated check trees are found to support a heavy infestation of red mites, whereas relatively very few such mites are found on the trees that were described as being sprayed with the tin compounds. No plant injury resulting from use of the tin compounds is observed.

*Example 6*

Further portions of the aqueous compositions as described in Example 5 are employed in late May for the control of chiggers (*Trombicula irritans*) in a children's summer camp of approximately 50 acres extend along a marshy lake shore and situated between the 35th and 40th parallels, north and the meridians at 90th and 95th degrees west of Greenwich, England. In such operations, the compositions are applied to the chiggers themselves and also so disposed as to lay down a barrier in passing which the chiggers must make at least tarsal contact with one of the tricyclohexyl tin compounds. Application is made by helicopter spray at a time when the camp is unoccupied. Following the treating operations, the camp is opened to summer occupants. During June and July no serious problem of chigger infestation is experienced. Moderate reinfestation is noted by mid August. Plants of the treated area are scrutinized, but no plant injury ascribable to the tin compound is noted.

*Example 7.—Control of black widow spiders*

An aqueous solution of tricyclohexyl tin acetate is prepared in the manner described for tricyclohexyl tin chloride in the second preparation of Example 1. This concentrate tricyclohexyl tin acetate composition is dispersed in water to prepare an aqueous composition containing 500 parts of the tin compound per million by weight of composition. This composition is employed to control black widow spiders, found in mid-August, a few weeks before the beginning of expected seasonal use, infesting the basement of a small, isolated public school building located between the meridians at 102 and 105 degrees, respectively, west of Greenwich and between the 37th and 40th parallels, north latitude. Treatment is confined to the infested zone. Building contents susceptible of water spray injury are removed or covered. Because the involved species (*Latrodectus mactans*) produces little web and that not dense, web removal is not undertaken.

A thorough wetting spray is applied to all visible spiders, and upon structure and contents of the infested area so that individual spiders must make at least tarsal contact with the tricyclohexyl tin acetate in migration to areas in common human use. The area is scrutinized one week later. Webs are unoccupied. Numerous dead spiders and no live ones are found infesting the treated area. The same situation prevails upon re-examination in October and in early December.

*Example 8.—Control of resistant spider mites*

A population of two-spotted spider mites (*Tetranychus bimaculatus* Say) infesting cultivated rose bushes at Belle Glade, Florida is sprayed first on December 10 with O,O-diethyl O-p-nitrophenyl phosphorothioate in accordance with the manufacturer's recommendation, in an attempt to destroy the mite population. On December 22 of the same year the same bushes are similarly sprayed in accordance with the manufacturer's recommendations with an aqueous dispersion of the O,O-dimethyl dithiophosphate of diethyl mercaptosuccinate. On January 5 of the succeeding year, the same bushes are again sprayed with each of two toxic substances, the first being a repetition of the application set forth immediately foregoing, and the second on the same day being of 1,2-dibromo-2,2-dichloroethyl dimethyl phosphate also according to the manufacturer's recommendations. On January 12 and again on January 18 immediately following, applications are made of the toxicant and in the method last set forth immediately foregoing. On February 7, immediately following, application is made in aqueous dispersion and in accordance with the manufacturer's recommendations of O,O,O',O'-tetraethyl S,S'-methylene bisphosphorodithioate. On February 12, application is repeated, as hereinbefore set forth, of O,O-dimethyl dithiophosphate of diethyl mercaptosuccinate. Finally, as the ninth and last treatment on February 20, application is repeated of the O,O,O',O'-tetraethyl S,S'-methylene bisphosphorodithioate. Thus, all these applications are applied in a period of two months and ten days, from December 10 of one year through February 20 of the year next following, all the employed toxicants being commercially successful pesticides recommended for the control of mites of the said species. At the end of this time, the rose bushes are carefully examined and found to be heavily infested with mites of the said species, of a strain in which has developed an extreme degree of pesticide tolerance.

A representative population of the said mites is taken, together with host rose bush branches, and permitted to migrate to young and vigorously growing bean plants maintained in earthen pots in a greenhouse laboratory. The pots are maintained at all times standing in water in large trays, the plants being so positioned that mites falling from the plants, or even somewhat laterally transported by air currents, will fall into the water; the pan wall interior surfaces above the water line are heavily coated with grease. Under these conditions, and with these precautions to prevent escape of the pesticide-tolerant mites, they are tested for susceptibility to pesticides. Their resistance, undiminished on the new host plant, is proved by spraying them with an aqueous O,O-dimethyl dithiophosphate of diethyl mercaptosuccinate in a concentration of 1,000 parts per million representing a rate several times greater than that recommended by the manufacturer for similar uses. This substance at this rate kills some, but fails to achieve satisfactory control of the mites.

Mites of this resistant population are transferred to new stands of young and vigorous bean plants maintained under the conditions before described, and permitted to multiply. Thereafter, the resulting multiplied population is distributed among and permitted to grow upon each of a large number of young and vigorous bean plants maintained under the described conditions. The plants thus heavily infested with toxicant-resistant mites are treated by application, as aqueous spray, of various toxicants to determine their effect upon the said mites. It is found that an aqueous dispersion of tricyclohexyltin hydroxide at 50 parts per million, 25 parts per million, 12.5 parts per million and 10 parts per million achieves 100 percent kill of said mites.

When the toxicant is applied in aqueous dispersions in concentrations in the range of from 5 to 8 parts per million, the resulting kill of the said mites is high but less than 100 percent, typically between 90 and 95 percent.

Example 9

A sample of the mite population surviving the incompletely fatal lowest dosage application of tricyclohexyltin hydroxide as set forth in Example 8 is transferred to the leaves of young and healthy bean plants maintained under conditions similar to those described in Example 8. This population is permitted to stand for three months during which time it multiplies and increases in number. Thereafter, it is treated by the application of an aqueous dispersion of from 5 to 8 parts of tricyclohexyltin chloride per million parts total dispersion, an amount sufficient to kill about 95 percent of the mites. Following this treatment, the survivors are transferred to another group of young and vigorous bean plants, and permitted to stand for several months undisturbed to increase in numbers. At the end of three months population increase, the bean plants are again sprayed with an essentially identical aqueous dispersion of tricyclohexyltin chloride, and again, the resulting kill is about 95 percent. Of the survivors of this treatment, a sample is transferred to yet another group of bean plants. After a three month interval during which the survivors multiply and increase in number, they are treated by the application thereto of tricyclohexyltin acetate at a concentration of about 8 to 10 parts of the said compound per million parts of aqueous dispersion. This treatment results in a 94 percent kill of the said mites. The relatively constant ratio between concentration and kill indicates that development of population tolerance to the said compound is negligible or non-existent. The survivors are transferred to another group of young and vigorously growing bean plants and maintained under favorable conditions to increase in numbers. At the end of a three month increase, the said bean plants are again treated with tricyclohexyltin acetate in a concentration of 8 to 10 parts per million parts by weight of aqueous preparation and the resulting kill is found to be 95 percent, a slightly higher proportion than had been killed in the test employing the same chemical substance on the progenitor generation of the same mites three months earlier. Thus it is ascertained that, to the extent indicated in the present tests, the pesticide tolerant strain of mites does not develop tolerance to the present toxicants.

Example 10

Tests essentially similar to those foregoing are carried out on other strains of mites of the same species, including one not known to manifest any tolerance of commercial pesticides, and another which has developed a high tolerance of the pesticides commonly employed on cotton plants in the control of mites of this species. Employing aqueous dispersions of 10 parts of toxicant by weight per million parts by weight of ultimate dispersion it is found that 100 percent control of all these strains is achieved when employing, as sole toxicant, each of Tricyclohexyltin bromide,
Tricyclohexyltin fluoride,
Bis tricyclohexyltin oxalate,
Bis tricyclohexyltin malonate,
Bis tricyclohexyltin sulfide,
Tris tricyclohexyltin borate,
Bis tricyclohexyltin sulfate,
Lauryl tricyclohexyltin,
Octanoyl tricyclohexyltin,
Oleyl tricyclohexyltin,
Eicosyl tricyclohexyltin,
Tricyclohexyltin fluoride,
Tricyclohexyltin formate,
Tricyclohexyltin propionate,
Tricyclohexyltin borate,
Allyl tricyclohexyltin,
Vinyl tricyclohexyltin,
(Tricyclohexylstannyl)tricyclohexyltin,
Bis tricyclohexyltin sulfide,
Tricyclohexyltin iodide,
Tricyclohexyl(methylsulfonylthio)tin,
Tricyclohexyl(isopropylsulfonylthio)tin,
Tricyclohexyl(phenylsulfonylthio)tin,
Tricyclohexyl((p-bromophenyl)sulfonylthio)tin,
Tricyclohexyl(propionylthio)tin,
Tricyclohexyl(benzoylthio)tin,
Tricyclohexyl(2,4,5-trichlorobenzoylthio)tin,
Tricyclohexyloxy ethoxytricyclohexyltin,
Sulfonyl bis(tricyclohexyltin), and
Sulfinyl bis(tricyclohexyltin).

Other groups representative of the same populations are similarly treated with, separately and respectively, tricyclohexyltin chloride, tricyclohexyltin acetate, and bis(tricyclohexyltin)oxide each at a concentration of 3 parts tin compound per million parts by weight of finished composition. As a result of each there is found a 100 percent kill of the said populations. That population tolerant of pesticides is killed as readily as the ordinary populations.

Of the tricyclohexyltin compounds employed in accordance with the present teachings certain individual compounds are here presented for the first time. However, all of them are prepared in known methods. Most of them have been described hitherto. For example, see Berichte der deutschen chemischen Gesellschaft 47, 3257–66 (1914); ibid., 57B 532–44 (1924): British Patent 760,056, and French Patent 1,253,725.

I claim:
1. Method which comprises the step of killing an arachnid by contacting the arachnid with an amount lethal thereto of a compound of the formula

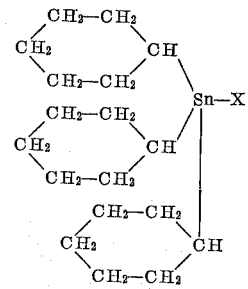

wherein X represents a member of the group consisting of hydroxyl, bromo, chloro, fluoro, iodo, alkenyl, alkanoyloxy, tricyclohexylstannyloxy, tricyclohexylstannylthio, tricyclohexylstannyl, (tricyclohexylstannyloxy)alkoxy, bis(tricyclohexylstannyloxy) - boryloxy, tricyclohexyltin sulfinyl, tricyclohexyltin sulfonyl, alkylsulfonylthio, phenylsulfonylthio, halophenylsulfonylthio, alkanoylthio, benzoylthio, halobenzoylthio, and formyloxy.

2. Method claimed in claim 1 wherein the tin compound is tricyclohexyltin hydroxide.

3. Method claimed in claim 1 wherein the tin compound is tricyclohexyltin chloride.

4. Method claimed in claim 1 wherein the tin compound is tricyclohexyltin acetate.

5. Method claimed in claim 1 wherein the tin compound is bis(tricyclohexyltin) oxide.

6. Method of claim 1 wherein the tin compound is tricyclohexyltin acetate and the arachnid is of the genus Tetranychus.

No references cited.

JULIAN S. LEVITT, *Primary Examiner.*

VERA C. CLARKE, *Assistant Examiner.*